United States Patent [19]
Sewell

[11] Patent Number: 5,967,630
[45] Date of Patent: Oct. 19, 1999

[54] GUARD AND CLEANER ASSEMBLY FOR A WHEEL

[75] Inventor: John P. Sewell, Aurora, Ill.

[73] Assignee: Caterpillar Inc., Peoria, Ill.

[21] Appl. No.: 09/031,618

[22] Filed: Feb. 27, 1998

[51] Int. Cl.⁶ .................................................. B60S 1/62
[52] U.S. Cl. .......................... 305/110; 305/100; 305/107; 305/110; 404/129
[58] Field of Search .................................. 305/100, 107, 305/110, 115; 301/37.1, 6.1, 6.3; 404/129

[56] References Cited

U.S. PATENT DOCUMENTS

| | | | |
|---|---|---|---|
| 4,818,040 | 4/1989 | Mezzancella et al. | 305/110 |
| 5,330,260 | 7/1994 | Freeman | 305/110 |
| 5,370,451 | 12/1994 | Brownlee et al. | 305/107 |
| 5,451,100 | 9/1995 | Freeman | 305/107 |
| 5,553,932 | 9/1996 | Freeman | 305/107 |
| 5,713,644 | 2/1998 | Freeman | 305/110 |
| 5,725,292 | 3/1998 | Keedy et al. | 305/110 |
| 5,733,020 | 3/1998 | McCartney et al. | 305/107 |
| 5,820,230 | 10/1998 | Freeman | 305/107 |

*Primary Examiner*—D. Glenn Dayoan
*Assistant Examiner*—Long Bao Nguyen
*Attorney, Agent, or Firm*—William C. Perry

[57] ABSTRACT

In the operation of machines of the type that are typically designed to traverse terrain having deposits of debris, it is a common problem to have the debris become attached to the wheels of the machine and rotate therewith. In many instances this causes material to become entrained around the axles of the machine requiring continual maintenance and occasionally causing damage to the axle components. In the present invention a guard assembly is provided that defines a scraping member that is positioned in radially inner and laterally overlapping relation to an outer cylindrical surface defined by each wheel. The scraping member function to remove material that may become attached to the wheels during their movement over the terrain. Functioning as such, material is prevented from becoming entrained about the respective axle assemblies of the machine.

19 Claims, 5 Drawing Sheets

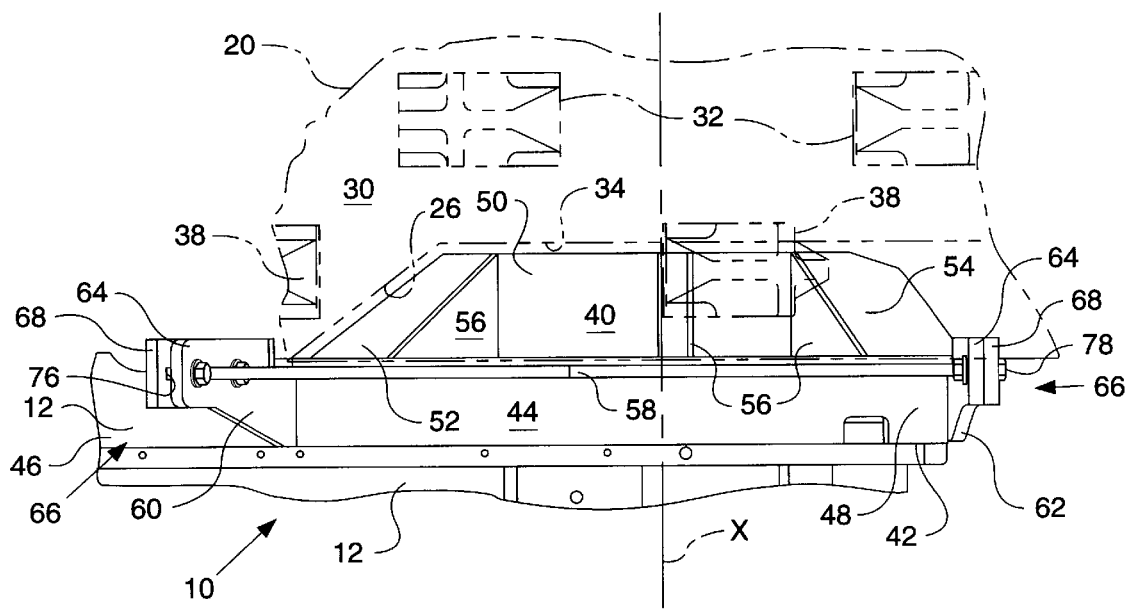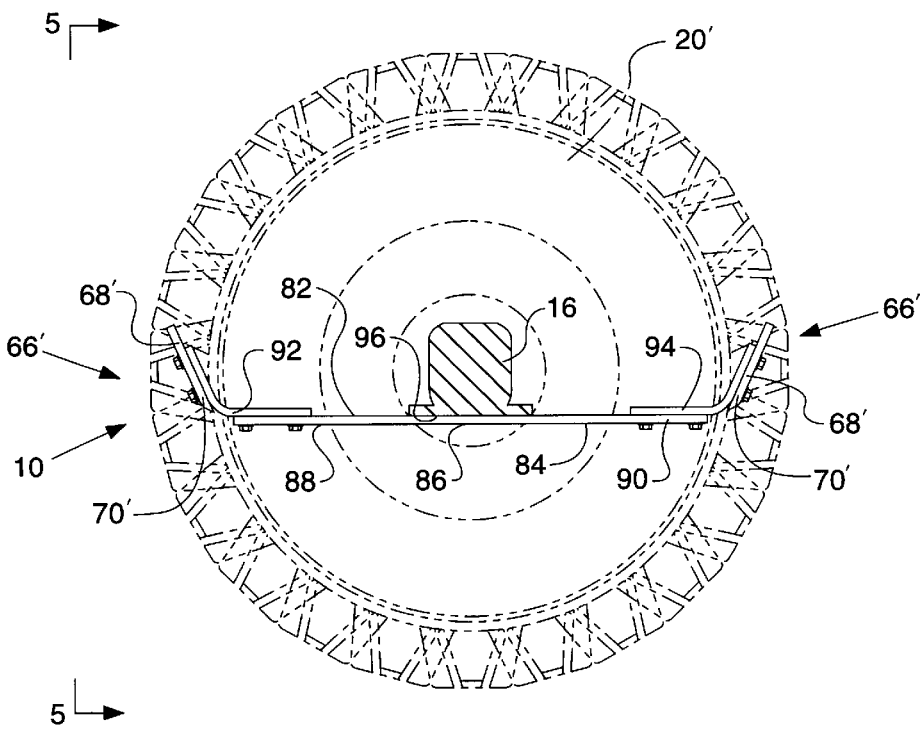

GUARD AND CLEANER ASSEMBLY FOR A WHEEL

DESCRIPTION

1. Technical Field

This invention relates to a guarding assembly and more particularly to a guarding mechanism to will remove material from the surface of a wheel to prevent the build-up of material around a wheel and axle assembly.

2. Background Art

In the operation of construction machinery, especially the type known as a landfill compactor, it is quite common for the machine to traverse terrain that is filled with debris. In the case of a landfill compactor, the machine is driven over trash of all kinds to compact or compress it so that maximum use may be made of the available space on the landfill site.

In many landfill sites, there is an abundance of cable, wire, strands of scrap from manufacturing operations and strands of many other types of material. When operating over this type of material, it is quite common for the teeth of the drum portion-type wheels to become attached to these strands of material as they roll over it. In doing so, the strands of material are caused to revolve with the wheel and many times fall from the upper portion of the wheel, down on the axle. As the movement of the machine continues, the strands can become wrapped around the axle. In some instances, the material will become tightly wrapped around the axle and the wound material will tend to work its way along the axle in the direction of the wheel. This is an area wherein the final drive of the wheel assembly interfaces with the axle. Since the wheel assembly rotates along this interface and the axle does not, a rotational seal is required at this interface to keep dirt out and lubricating fluid within the axle assembly. It is a common and vexatious problem when this material becomes wound around the axle in the area of the seal interface because the strands, by the force of the winding, are forced into the sealed interface. When this happens the integrity of the seal is destroyed creating the need for immediate repair. This not only takes the machine out of production, it is also known to have a deleterious effect on the components of the drive assembly.

The present invention is directed to overcoming one or more of the problems set forth above.

DISCLOSURE OF THE INVENTION

In one aspect of the present invention a guard assembly is provided that includes a frame and an axle assembly that is mounted to the frame. A wheel is provided that has a drum portion that defines an outer surface. The wheel is mounted on the axle assembly for rotation with respect thereto with the inner side of the drum portion positioned adjacent the frame. A guard member, having at least one mounting bracket, is mounted to either the frame or the axle assembly in a manner to position the arm at a location that is radially outwardly adjacent the inner side of the outer surface of the drum portion. A scraping means, having an engagement end portion, is mounted to the mounting bracket defined by the guard member in a manner wherein the engagement end is positioned in overlapping, parallel relation to the outer surface of the drum portion on the inner side thereof.

In another aspect of the present invention, a guard assembly is provided for a machine that has a frame and a pair of first and second axle assemblies mounted to the frame at spaced locations from one another along a centerline of the machine. Each axle assembly has an end portion that extends laterally from opposing sides of said frame. A wheel, having an outer cylindrical surface defined thereon, is mounted to each end portion of the axle assemblies. A first pair of guard members is provided, each having a base portion and a pair of scraping means. The first guard members are mounted to opposite sides of the frame in inwardly adjacent relation to the respective wheels. The respective base portions are positioned in surrounding relation to the respective end portions of the first axle assembly with the scraping means positioned in overlapping, parallel relation to the cylindrical outer surfaces of the respective wheels. A pair of second guard members, also having a pair of scraping means, is mounted to opposite end portions of the second axle assembly between the respective sides of the frame and the respective wheels. The scraping means is positioned in overlapping, parallel relation to the cylindrical outer surfaces of the respective wheels.

With a guard assembly as set forth above, a scraping means is provided between the frame and each of the wheels of a machine and provides a mounting for one or more scraping members. The scraping members are mounted radially outwardly from the surface of the wheel and overlaps the inner portion of the wheel. Being so positioned, the scraping means will remove material from the inner portion of the wheel before it has an opportunity to be carried around the wheel. Further, since the scraping means is positioned on the inner portion of the wheel, the chance for material to revolve with the wheel, fall off on the inner side of the wheel and become wrapped around the axle assembly is greatly reduced.

BRIEF DESCRIPTION OF THE DRAWINGS

FIG. 3 is a diagrammatic top view taken along lines 3—3 of FIG. 2;

FIG. 4 is a diagrammatic side view, similar to FIG. 2, showing a an alternate embodiment of guard assembly;

BEST MODE FOR CARRYING OUT THE INVENTION

Figure 5:
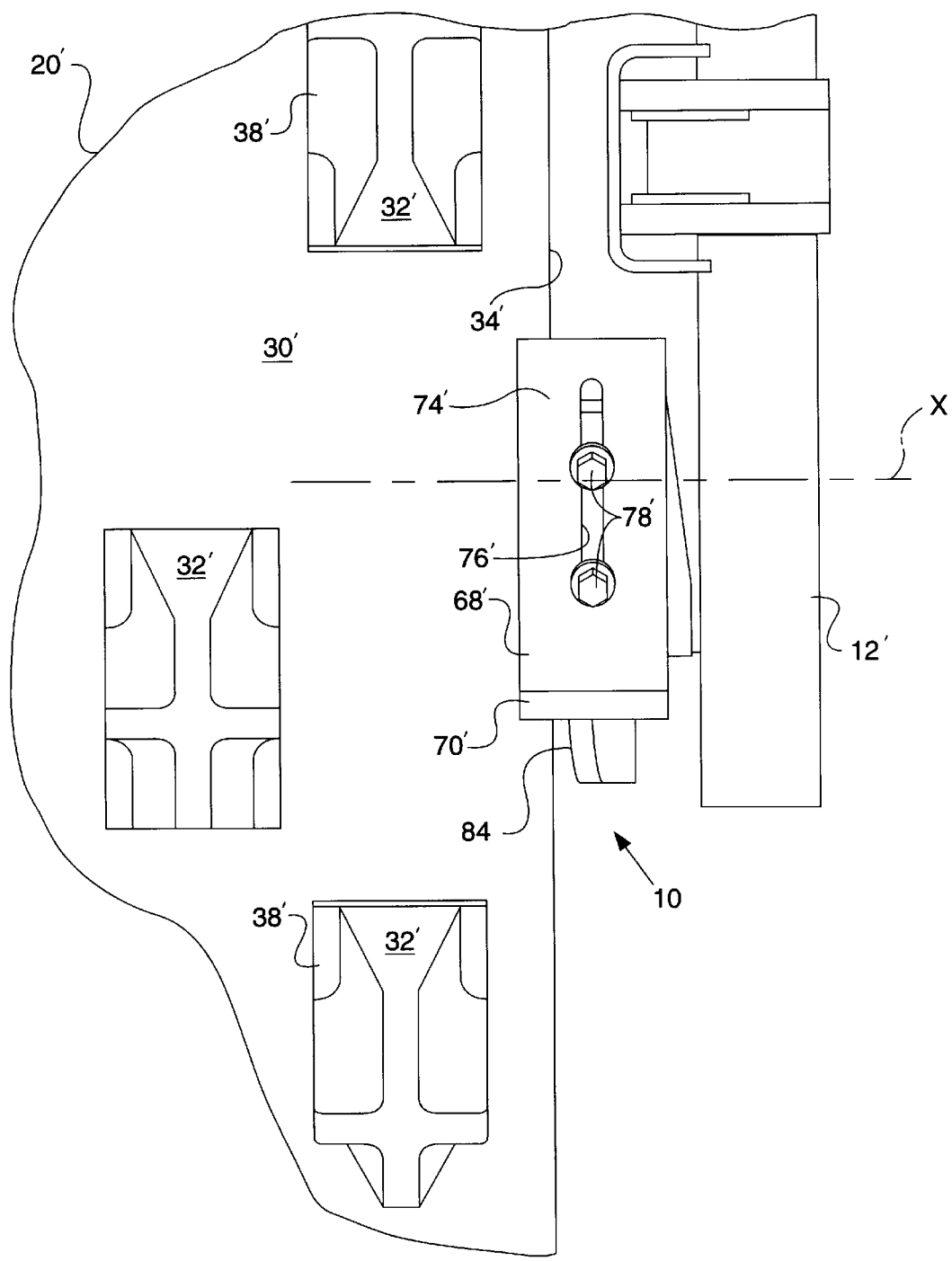
FIG. 5 is a diagrammatic, enlarged side view taken along lines 5—5 of FIG. 4.
Figure 6:
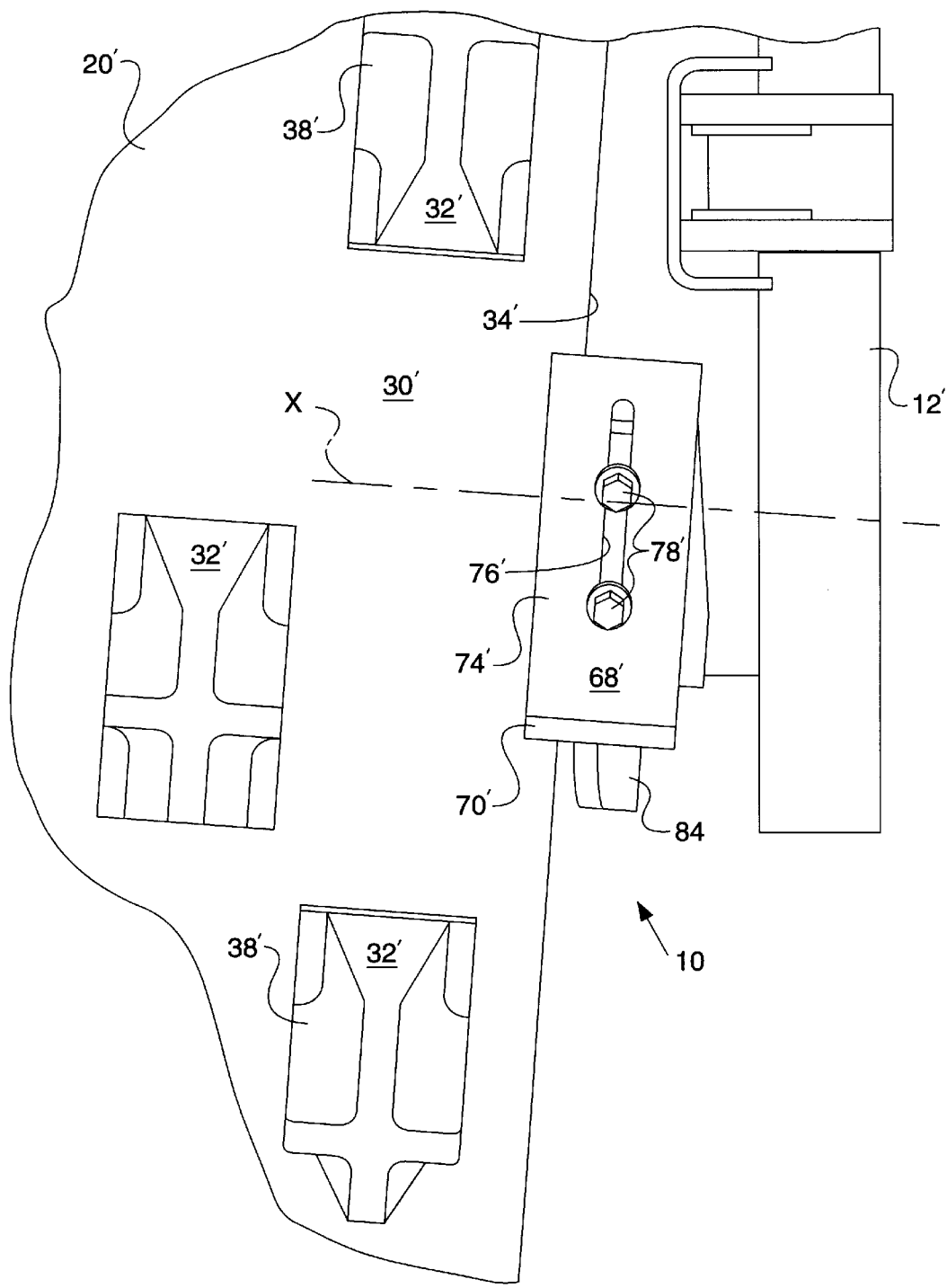
FIG. 6 is a diagrammatic, enlarged side view, similar to that of FIG. 5 showing an axle and wheel assembly oscillated with respect to the machine.

Referring to the drawings, a guard assembly 10 for a machine is shown. The machine includes a frame 12 and a pair of axle assemblies 14 (FIGS. 1–3) and 16 (FIGS. 4–6). The axle assemblies are mounted to the frame 12 in spaced relation to one another along a longitudinal centerline (not shown) that is defined by the machine.

Figure 1:
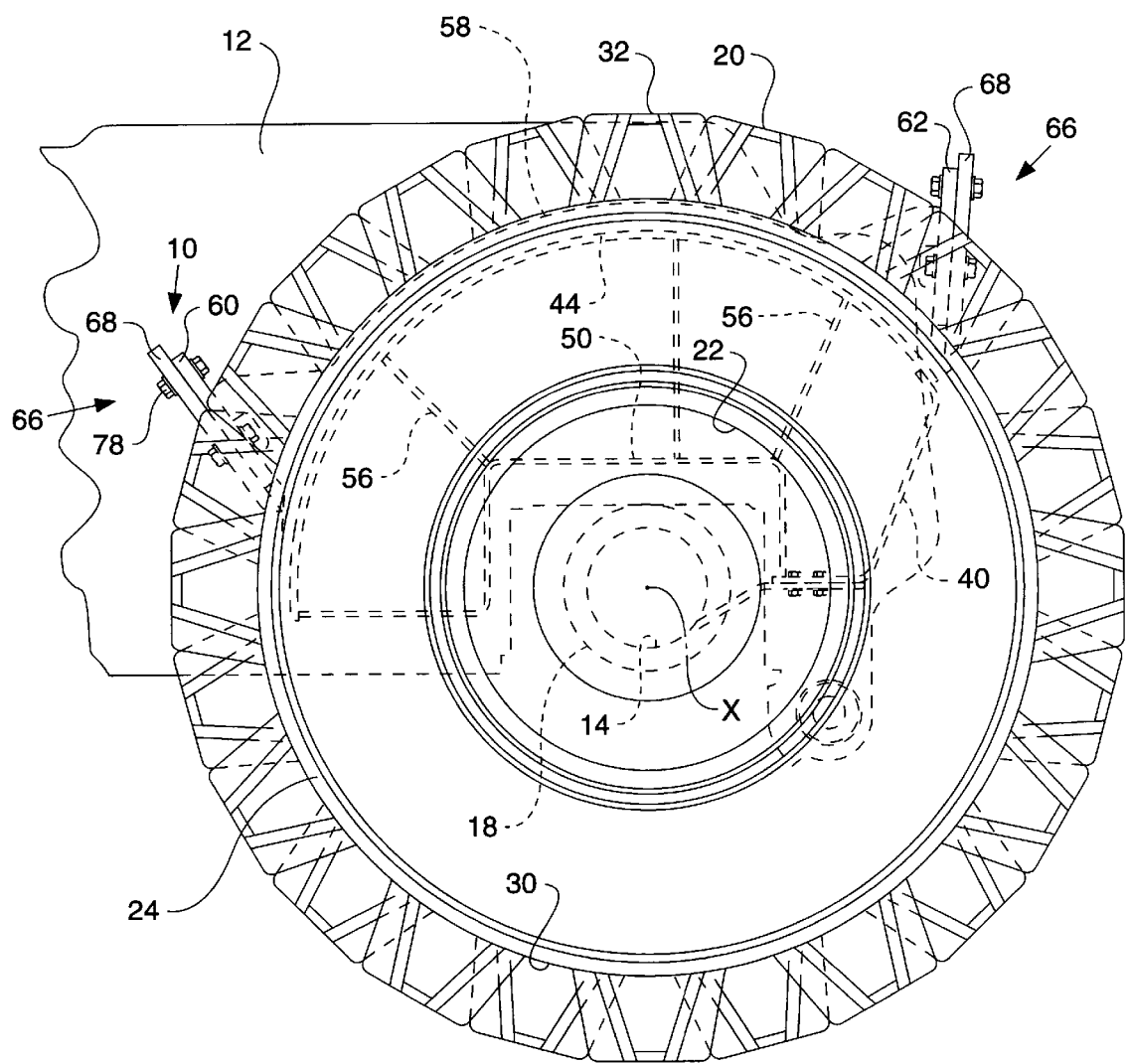
FIG. 1 is a diagrammatic side view of a portion of a machine with a guard assembly that embodies the principles of the present invention.
Figure 2:
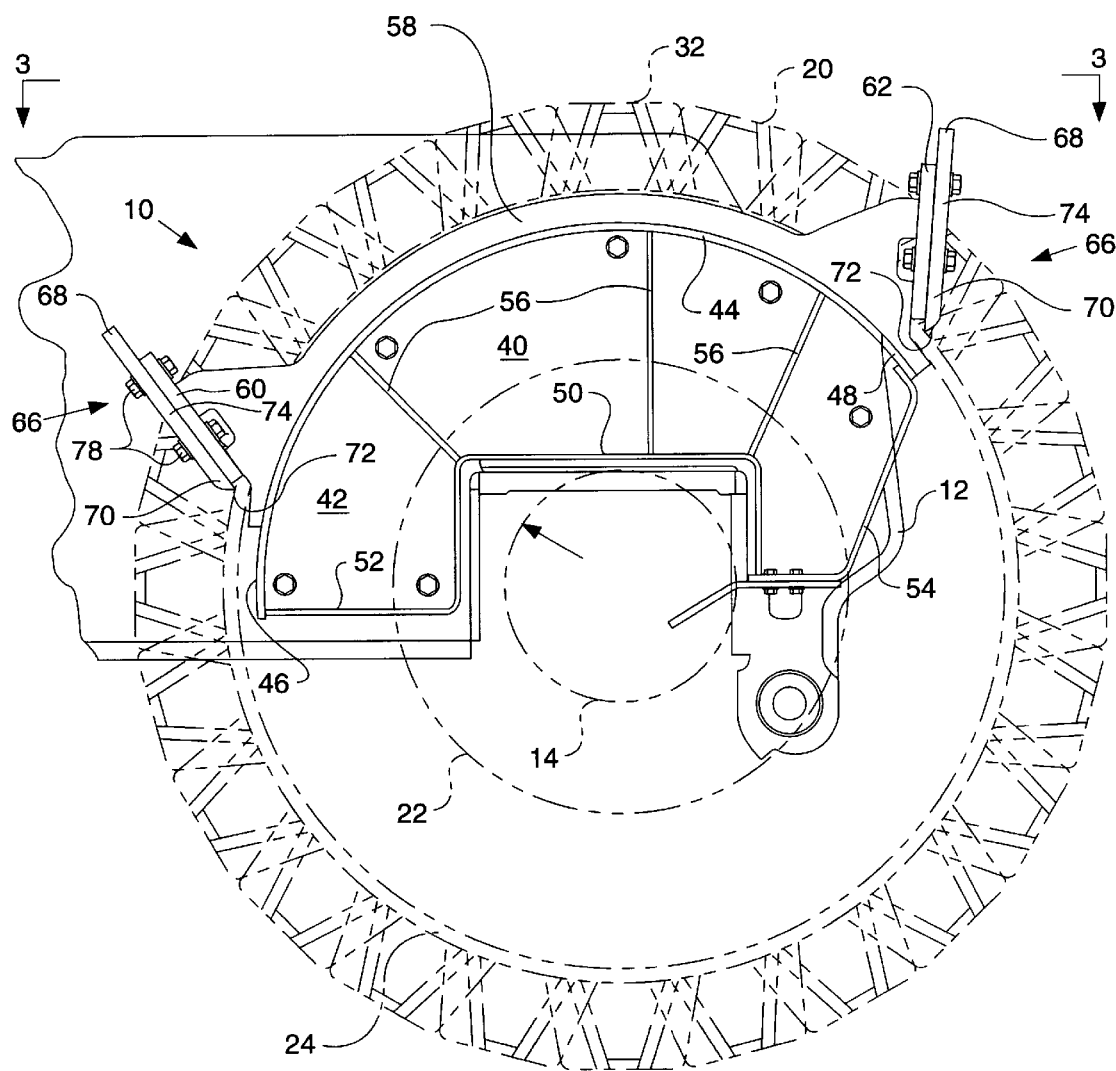
FIG. 2 is a diagrammatic, partially sectioned view of the frame of the machine shown in FIG. 1.

Referring to FIGS. 1–3, it can be seen that axle assembly 14 is mounted to the frame 12 and defines a pair of end portions 18 (one shown) that extend laterally outwardly from the frame. In the embodiment illustrated in FIGS. 1–3, the axle assembly 14 is fixedly mounted to the frame. A wheel 20 is mounted to the end portion 18 of the axle assembly and rotates with respect to the axle assembly and the frame in a well known manner. The wheel has an inner hub portion 22 and an outer drum portion 24 that are concentrically arranged about an axis X defined by the axle assembly 14. An inner and outer side wall extend between the hub and drum portions. In the illustrated embodiment, the drum portion 24 is substantially wider than the hub portion 22 and the side walls are tapered outwardly from the hub portion to a location that is closely adjacent the frame 12. It is to be understood that the hub portion and the drum portion could be the same width and thereby connected by side walls that are substantially straight up and down. The tapered inner side wall 26 is illustrated in FIG. 3. The drum portion 24 defines an outer cylindrical surface 30 that extends across the face of the drum. A plurality of teeth 32 are circumferentially positioned about the surface 30 in rows that are axially spaced between inner and outer sides defined by the outer cylindrical surface. As is best shown in FIG. 3, an innermost row of teeth 38 are spaced from the inner side 34 a preselected distance to provide a space about the drum between the inner side 34 and the first row of teeth.

A first guard member 40 is mounted to the frame 12 on each of an opposing side thereof in an area that is laterally adjacent the wheel 20, between the wheel and the frame. While only one guard assembly is shown in the drawings it is to be understood that the other side of the machine and like components secured to the frame, are a mirror image of those shown and described herein. The guard member 40, which is best shown in FIGS. 2 and 3, is comprised of a generally planar base portion 42 that fits substantially flat against the frame. An outer flange 44, that is generally arcuate in configuration, defines an upper extremity of the base portion 42. The outer flange 44 is positioned radially from the axis X of the axle assembly 14 a distance that positions it inwardly adjacent the drum portion 24 of the wheel. The outer flange has a radius that is substantially the same as that of the drum and is generally centered about the axis X of the axle assembly 14. The outer flange terminates with a pair of end portions 46 and 48. An inner flange 50 is defined on the lower region of the base portion 42 and extends laterally from the frame in a direction toward the hub portion 22 and terminates in closely adjacent proximity to the hub portion. The inner flange 50 is shaped to substantially surround the upper portion of the axle assembly 14 and defines opposing end portions 52 and 54 that are angled toward the frame to connect with the end portions 46 and 48 defined by the outer flange 44. The angled end portions 52 and 54 of the inner flange have an angle that substantially matches that of the taper defined by the inner side wall 26 of the wheel, as illustrated in FIG. 3. A plurality of plates 56 are also secured to each of the inner and outer flanges and extend therebetween at an angle that also is substantially equal to that of the tapered inner side wall 26 to position the plates in closely adjacent parallel relation to the inner side wall.

An arm 58 is mounted to extend from the outer flange 44 and has a pair of opposing end portions that terminate in a pair of mounting brackets 60 and 62. The mounting brackets extend radially outwardly beyond the drum portion 24 of the wheel 20 and define a backing plate 64 (FIG. 3). The backing plate extends laterally in overlapping relation to the outer cylindrical surface 30 but is spaced radially therefrom a preselected distance.

A scraping means 66 in the form of a plate member 68 is adapted for mounting to each of the backing plates 64. The scraping plate 68 has an angled engagement end portion 70 that defines an engagement surface 72 (FIG. 2) that extends from a substantially centrally disposed mounting portion 74. The mounting portion further defines a substantially centrally disposed, elongated slot 76 (FIG. 3). The slot 76 receives a plurality of fastening members 78 such as threaded fasteners that adjustably mount the scraping plate to the backing plate. Being so mounted the engagement surface 72 is positioned in laterally overlapping relation to the outer cylindrical surface 30. In addition, the elongated slot allows the scraping plate to be moved in a radial direction, toward and away from the outer cylindrical surface of the drum portion 24. This permits the distance between the engagement surface and the drum to be adjusted for proper spacing and/or to accommodate for any wear of the scraping plate that may occur as a result of normal operation.

Referring now to FIGS. 4–6, a second embodiment of the guard assembly 10 is shown. In this configuration, the wheel 20' is mounted to an axle assembly 16 for rotational movement with respect to the axle assembly. The axle assembly, in turn, is pivotally mounted along the longitudinal centerline of the machine. Being so mounted, the axle assembly is allowed to oscillate, with respect to the frame 12. It is a well known practice in some construction machines, such as landfill compactors, that an axle assembly 14 as previously described is mounted on a front portion of the machine, while an oscillating axle assembly 16 is mounted on the rear portion of the machine.

Referring primarily to FIG. 4, it can be seen that a second guard member 82 is mounted to the axle assembly 16 for pivoting movement therewith. The second guard member includes an arm 84 that has generally centrally located mounting portion 86. A pair of end portions 88 and 90 respectively, extend from the mounting portion 86 on opposite sides thereof. A pair of mounting brackets 92 and 94 are mounted to the opposing end portions of the arm, 88 and 90 respectively. The mounting portion 86 is adapted to engage a lower surface 96 defined by the axle assembly 16 and is secured thereto in a well known manner, such as by threaded fasteners or by welding. The mounting of the arm to the axle assembly in this manner positions the mounting brackets 92 and 94 laterally between the frame 12 and the drum portion 24. In addition, the mounting brackets extend radially outwardly from the drum portion.

A scraping means 66', in the form of a pair of scraping plates 68', is mounted to the respective mounting brackets 92 and 94. The scraping plates each have an angled end portion 70' and an elongated slot 76' defined in a central mounting portion 74' thereof. A plurality of threaded fasteners 78' is positioned in the slot 76' and engage the respective mounting brackets to secure the scraping plates to the mounting brackets. The scraping plates 68' are adjustably mounted to permit movement toward and away from the outer cylindrical surface 30' for reasons previously set forth.

As is shown best in FIGS. 5 and 6, the scraping plate 68' is positioned in overlapping relation to the outer cylindrical surface 30' of the drum portion 24'. The scraping plate extends past the inner side 34' of the wheel a distance that will substantially span the distance between the inner side 34' and the innermost row of teeth 38'. Since the second guard member 82 is mounted to the axle assembly 16, the scraping plates 68' are mounted such that they will move with the wheel 20' as it oscillates with respect to the frame. This condition is illustrated in FIG. 6. This places the scraping plates in operating condition at all times during the rotation of the wheel and during axle oscillation.

INDUSTRIAL APPLICABILITY

During the operation of a machine, such as a landfill compactor, it is a common occurrence for stands of material and/or debris to become attached to the teeth 32 of each wheel 20,20' as the machine traverses the landfill site compacting the material. As this occurs, any material that is picked up by the innermost row of teeth 38,38', that is closest to the inner side 34,34' of the outer cylindrical surface 30,30' defined by the wheels, will be removed by the scraping plates 68,68', since they are mounted in overlapping relation to the outer cylindrical surfaces defined by each wheel. The scraping plates defined by either the first or second guard members 40 and 82, are positioned on opposing sides of the wheels and therefore remove material before it has a chance to become entrained about the wheel. This greatly reduces the occurrence of material becoming wound around the respective axle assemblies. With the reduction of material wrapped around the axle, the opportunity for damage to any seal interface positioned along the axle assembly, is also greatly reduced. This not only reduces downtime required to remove the material wrapped around the axle, it also reduces instances of machine failure. This ultimately reduces the maintenance costs associated with machine operation and increases machine reliability and productivity.

Other aspects, objects and advantages of this invention can be obtained from a study of the drawings, the disclosure and the appended claims.

I claim:

1. A guard assembly, comprising:
   a frame;
   an axle assembly mounted to the frame;
   a wheel having a drum portion defining an outer surface, said outer surface having inner and outer sides, said wheel being mounted on the axle assembly for rotation with respect thereto with the inner side of the drum portion positioned in spaced, laterally adjacent relation to the frame;
   a guard member having at least one mounting bracket and being mounted to one of the frame and the axle assembly in a manner to position the mounting bracket at a location that is radially, outwardly adjacent the inner side of the outer surface of the drum portion; and
   a scraping means having an engagement end portion and being mounted to the mounting bracket defined by the guard member in a manner wherein the engagement end portion is positioned in overlapping, parallel relation to the outer surface of the drum portion on the inner side thereof.

2. The guard assembly as set forth in claim 1 wherein a plurality of teeth is mounted on the outer surface of the drum portion, said teeth being positioned circumferentially about the drum portion in axially spaced rows between the inner and outer sides of the outer surface.

3. The guard assembly as set forth in claim 1 wherein the guard member further includes:
   a base portion;
   a generally arcuate flange that is defined on an upper extremity of the base portion; and
   a pair of mounting brackets mounted on the flange and being positioned in laterally inwardly adjacent relation to the inner side of the outer surface of the drum portion between the frame and the drum portion.

4. The guard assembly as set forth in claim 3 wherein a scraping means is adjustably mounted to each of the mounting brackets mounted on the flange for movement toward and away from the outer surface defined by the drum portion.

5. The guard assembly as set forth in claim 4 wherein the scraping means is a plate member having an angled end portion that defines said engagement end portion and a mounting portion that defines at least one generally centrally located slot.

6. The guard assembly as set forth in claim 5 wherein a fastening means is positioned within the slot defined by the plate member to adjustably mount the plate member to the bracket of the guard member for movement toward and away from the outer surface of the drum portion.

7. The guard assembly as set forth in claim 1 wherein the guard member further includes:
   an arm having a mounting portion and a pair of laterally extending end portions that extend from opposite sides of the mounting portion, said mounting portion being adapted for attachment to the axle assembly; and
   a pair of brackets mounted on opposing ones of the respective end portions of the arm.

8. The guard assembly as set forth in claim 7 wherein a plate member having an angled end portion is mounted to each of the brackets mounted on the arm, said plate members being adjustably mounted to the brackets with the angled end portions in overlapping, parallel relation to the drum portion for movement toward and away from the outer surface thereof.

9. The guard assembly as set forth in claim 8 wherein the arm is mounted to a lower portion of the axle assembly and each end portion thereof extends radially from the axle assembly to position the plate members at a location that is outwardly adjacent the drum portion at an elevation that is lower than the axle assembly.

10. In a machine having a frame, first and second axle assemblies mounted to said frame at spaced locations from one another along a centerline of the machine, each axle assembly having an end portion extending laterally from opposing sides of said frame and a wheel having an outer cylindrical surface defined thereon and being mounted to each end portion of the axle assemblies, a guard assembly comprising:
    a pair of first mounting brackets having a base portion and a pair of scraping means, said mounting brackets being mounted to opposite sides of the frame, in inwardly adjacent relation to the respective wheels, with the respective base portions in surrounding relation to the respective end portions of the first axle assembly with the scraping means positioned in overlapping, parallel relation to the cylindrical outer surfaces of the respective wheels; and
    a pair of second mounting brackets having a pair of scraping means, said second mounting brackets being mounted to opposite end portions of the second axle assembly between the respective sides of the frame and the respective wheels with the scraping means positioned in overlapping, parallel relation to the cylindrical outer surfaces of the respective wheels.

11. The guard assembly as set forth in claim 10 wherein each of the first mounting brackets are defined by first guard members that further include:
    a substantially planar base plate that is secured to the frame;
    an outer flange defined on an upper region of the base plate at a location that is substantially adjacent the outer cylindrical surface of the wheel;
    an inner flange defined on a lower region of the base plate and positioned thereon to substantially surround an upper portion of the axle assembly;
    a pair of mounting brackets defined on the outer flange in a manner to position the mounting brackets between the wheel and the frame and radially outwardly of the outer cylindrical surface; and
    a plate member having a scraping surface defined thereon and being adjustably mounted to the bracket member in overlapping, parallel relation to the outer cylindrical surface of the wheel for movement toward and away therefrom.

12. The guard assembly as set forth in claim 11 wherein the wheel member has a drum portion that defines said outer cylindrical surface and a hub portion having a width less than that of the outer cylindrical surface, said hub portion being spaced radially inwardly from the drum portion to define an inner and an outer tapered side wall extending between the hub and drum portions.

13. The guard assembly as set forth in claim 12 wherein the inner flange of the first guard member extends laterally from the frame along the axle assembly to a positioned that is laterally adjacent the hub member and at least one plate member is secured to and extends between the inner and outer flanges at an angle therebetween, said plate member being positioned closely adjacent and substantially parallel to the inner side wall of the wheel.

14. The guard assembly as set forth in claim 10 wherein each of the second guard members include:

an arm having a mounting portion and a pair of laterally extending end portions extending from opposite sides of the mounting portion, each end portion having a bracket formed thereon, said mounting portion being adapted for attachment to the axle assembly for movement therewith; and a pair of plates adapted for mounting to the respective brackets defined by the arm, each of said plates having the scraping means defined thereon.

15. The guard assembly as set forth in claim 14 wherein the scraping means is defined by an angled scraping surface formed on an end portion of each of the plates, said plates being mounted to the respective brackets with scraping surface positioned in parallel, overlapping relation to the outer cylindrical surface of the drum portion for movement toward and away from the drum portion.

16. The guard assembly as set forth in claim 10 wherein a plurality of teeth are positionable on the outer cylindrical surface of the wheel, said teeth being positioned circumferentially about the drum portion in axially spaced rows between an inner and outer sides of the outer cylindrical surface.

17. The guard assembly as set forth in claim 16 wherein a first row of teeth is spaced from the inner side of the outer cylindrical surface a preselected distance and the scraping means is positioned in overlapping relation to the cylindrical outer surface between the inner side thereof and the first row of teeth.

18. The guard assembly as set forth in claim 10 wherein the scraping means defined by the first guard members are positioned at a location that is above an axis defined by the first axle assembly and on opposite sides thereof, said scraping means being mounted at an acute angle with respect to the outer cylindrical surface defined by the wheel.

19. The guard assembly as set forth in claim 10 wherein the scraping means defined by the second guard members are positioned at a location that is below an axis defined by the second axle assembly on opposite sides thereof, said scraping means being mounted at an acute angle with respect to the outer cylindrical surface defined by the wheel.

* * * * *